United States Patent
Mylly

(10) Patent No.: US 7,278,033 B2
(45) Date of Patent: Oct. 2, 2007

(54) METHOD AND A SYSTEM FOR DETERMINING THE POWER CONSUMPTION IN CONNECTION WITH AN ELECTRONIC DEVICE, AND AN ELECTRONIC DEVICE

(75) Inventor: Kimmo Mylly, Tampere (FI)

(73) Assignee: Nokia Corporation, Espoo (FI)

( * ) Notice: Subject to any disclaimer, the term of this patent is extended or adjusted under 35 U.S.C. 154(b) by 472 days.

(21) Appl. No.: 10/401,338

(22) Filed: Mar. 26, 2003

(65) Prior Publication Data

US 2003/0188205 A1   Oct. 2, 2003

(30) Foreign Application Priority Data

Mar. 27, 2002  (FI) .................................. 20020594

(51) Int. Cl.
*G06F 1/00* (2006.01)
*G06F 1/26* (2006.01)
*G06F 1/32* (2006.01)

(52) U.S. Cl. ................. 713/300; 713/320; 713/322

(58) Field of Classification Search ............... 713/300, 713/320, 322
See application file for complete search history.

(56) References Cited

U.S. PATENT DOCUMENTS

| | | | |
|---|---|---|---|
| 4,841,440 A | 6/1989 | Yonezu et al. | |
| 5,532,945 A * | 7/1996 | Robinson | 713/321 |
| 5,606,704 A | 2/1997 | Pierce et al. | |
| 5,613,130 A | 3/1997 | Teng et al. | |
| 5,737,616 A | 4/1998 | Watanabe | |
| 5,758,108 A | 5/1998 | Nakamura | |
| 5,758,171 A | 5/1998 | Ramamurthy et al. | |
| 5,884,086 A | 3/1999 | Amoni et al. | |
| 5,892,729 A * | 4/1999 | Holder, Jr. | 365/233 |
| 5,996,083 A * | 11/1999 | Gupta et al. | 713/322 |
| 6,178,514 B1 | 1/2001 | Wood | |
| 6,477,388 B1 * | 11/2002 | Schmutz | 455/522 |
| 6,785,830 B1 * | 8/2004 | McKeen et al. | 713/320 |
| 6,859,882 B2 * | 2/2005 | Fung | 713/300 |

FOREIGN PATENT DOCUMENTS

| | | |
|---|---|---|
| GB | 2235797 | 3/1991 |
| WO | 9841987 | 9/1998 |
| WO | 0207494 | 1/2002 |

* cited by examiner

*Primary Examiner*—Chun Cao
*Assistant Examiner*—Ji H Bae

(57) ABSTRACT

The present invention relates to a method and a system for determining the power consumption in an electronic device, to which a peripheral device is connected, to which the power is supplied from the electronic device. At least a first maximum value and a second maximum value, higher than the first maximum value, are determined for the power consumption. Signaling between the electronic device and the peripheral device sets a maximum value for the power consumption of the peripheral device which is between said first and second maximum values. The invention also relates to an electronic device and a peripheral device, in which the method is applied.

29 Claims, 4 Drawing Sheets

METHOD AND A SYSTEM FOR DETERMINING THE POWER CONSUMPTION IN CONNECTION WITH AN ELECTRONIC DEVICE, AND AN ELECTRONIC DEVICE

CROSS-REFERENCE TO RELATED APPLICATIONS

This application claims priority under 35 USC §119 to Finnish Patent Application No. 20020594 filed on Mar. 27, 2002.

FIELD OF THE INVENTION

The present invention relates to a method for determining the power consumption in an electronic device, to which a peripheral device is connected, which is supplied with power from the electronic device. The invention also relates to a system which comprises an electronic device provided with means for connecting a peripheral device and means for supplying power to the peripheral device, and which system comprises means for determining the power consumption. Furthermore, the invention relates to an electronic device provided with means for connecting a peripheral device, means for supplying power to the peripheral device, and means for determining the power consumption of the peripheral device. Moreover, the invention relates to a peripheral device provided with means for connecting the peripheral device to an electronic device, from which the power needed for using the peripheral device is arranged to be supplied to the peripheral device.

BACKGROUND OF THE INVENTION

At present, several such electronic devices are in use, to which it is possible to connect various peripheral devices, e.g. to expand the properties of the electronic device and to produce auxiliary functions. For example, it is possible to connect peripheral devices, such as connection cards (e.g. PCMCIA cards), to laptop computers to connect the laptop computer to a local area network, a landline or wireless telephone network, etc. Furthermore, peripheral devices can be used to expand the memory of the laptop computer, to connect an external fixed disk, a CDROM station, or the like.

The MultiMediaCard™ Association is, among other things, developing a standard for memory expansion boards (MultiMediaCard™; MultiMediaCard™ is a trademark of Infineon Technologies AG). These memory expansion boards can be used in various portable electronic devices, such as wireless communication devices and communicator type devices, to expand the memory capacity.

Because the peripheral devices can be connected to a variety of devices, the power consumption of the peripheral device should not exceed the maximum power that can be supplied from the electronic device to the peripheral device. Otherwise, the operation of the peripheral device and/or the electronic device may be disturbed and the electronic device may even be overheated. On the other hand, the power consumption requirements of different peripheral devices may be very different, wherein manufacturers of electronic devices should provide for the maximum power consumption in the power supply of the peripheral device connection. Solutions are known, such as Nokia Communicator 9110/9210, in which the power supply of the peripheral device connection of the electronic device is provided with a relatively efficient regulator, for example in the order of 150 mA/3 V. Such an efficient regulator is a relatively bulky component, which may cause placement problems, particularly in portable electronic devices. The provision for the maximum power consumption will be unnecessary in such electronic devices, whose users do not use, in connection with the electronic device, such a peripheral device whose power consumption is close to the maximum power consumption of the peripheral device designed for the electronic device. On the other hand, another user of a similar electronic device may use such a peripheral device whose power consumption is in the order of the maximum power consumption of the peripheral device designed for the electronic device.

In some electronic devices and peripheral devices to be connected to them, the operating voltage is selected at the stage when the peripheral device is turned on, e.g. when the electronic device is turned on or when the peripheral device is connected. Thus, signalling will be performed between the electronic device and the peripheral device, for the electronic device to determine the level of the operating voltage required by the peripheral device and to select an operating voltage suitable for the peripheral device to the operating voltage line(s) of the peripheral device.

In said MultiMediaCard Association, a maximum limit has been proposed for the power consumption of memory cards of the MultiMediaCard™ type. Thus, in electronic devices supporting this standard, the provision is made to supply a defined maximum power to the peripheral device. Moreover, the power consumption of memory cards of the MultiMediaCard™ type should thus not exceed the defined maximum limit. Such an arrangement is difficult, for example, for the reason that the power consumption of new memory cards to be developed is limited to this maximum value, wherein it may be an impediment for the implementation of such memory cards whose power consumption cannot be made smaller than the selected maximum limit. If the maximum limit is set so high that the power consumption of other memory cards to be developed later on is also very likely to be smaller than this, it will mean that relatively efficient and large regulators must be used in electronic devices, perhaps unnecessarily.

The power consumption of the peripheral device is normally proportional to the clock frequency used in the peripheral device, wherein an increase in the clock frequency will increase the power consumption. In a corresponding manner, to decrease the power consumption, the clock frequency of the peripheral device can be decreased, if this is possible in view of the other functions of the peripheral device. However, the operating rate of the peripheral device will thus decrease, which is not necessarily desirable. Also, the bus width used in the peripheral device has an effect on how much power is consumed in the peripheral device.

SUMMARY OF THE INVENTION

It is an aim of the present invention to provide an improved method and system for determining the power consumption to be suitable in each situation. It is another aim of the invention to provide an electronic device and a peripheral device for applying the method. The invention is based on the idea of determining at least a first and a second maximum value for the power consumption, wherein the electronic device and the peripheral device set the power consumption to a value between these first and second maximum values. Thus, in different operating situations, for example the peripheral device can adjust its power consumption to be suitable for the situation. The method according to the present invention is primarily characterized in determining, for the power consumption, at least a first maximum value and a second maximum value which is higher than the first maximum value, and setting, between the electronic device and the peripheral device, the maximum for the power consumption of the peripheral device to a value which is substantially between said first and second maximum values. The system according to the invention is primarily characterized in that at least a first maximum value and a second maximum value which is higher than the first maximum value, are defined for the power consumption, and that the means for determining the power consumption comprise means for setting the maximum for the power consumption of the peripheral device to a value which is between said first maximum value and said second maximum value. The electronic device according to the invention is primarily characterized in that at least a first maximum value and a second maximum value which is higher than the first maximum value, are defined for the power consumption, and that the means for determining the power consumption comprise means for setting the maximum for the power consumption of the peripheral device to a value which is between said first maximum value and said second maximum value. Furthermore, the peripheral device according to the invention is primarily characterized in that at least a first maximum value and a second maximum value which is higher than the first maximum value, are defined for the power consumption, and that the means for determining the power consumption comprise means for setting the maximum for the power consumption of the peripheral device to a value which is between said first maximum value and said second maximum value.

The present invention shows remarkable advantages over solutions of prior art. By the method according to the invention, it is possible to avoid the use of an unnecessarily large regulator in an electronic device, which saves costs, and wherein the size of the electronic device can, in some cases, be reduced and, on the other hand, problems of heating caused by high power consumption can be avoided. Also the power consumption can be reduced, which is advantageous particularly in portable devices. By means of the invention, the peripheral device connection can also be provided with flexibility, because the power consumption of the peripheral device can be adjusted and set to a value suitable for each situation of use. Also, the clock frequency and bus width of the peripheral device can be changed in the system according to an advantageous embodiment of the invention. Furthermore, the invention makes it possible that new peripheral devices to be developed will function in connection with electronic devices made earlier, and existing peripheral devices will function in connection with new electronic devices to be developed. With the solution according to the invention, it is also possible to achieve an improvement in the user-friendliness of the electronic device, for example, in a situation in which the peripheral device cannot fully operate on a lower level of power consumption but it can, however, inform the electronic device about this. Thus, the electronic device can take care of the shutdown (turning off) of the peripheral device in the appropriate way and notify the user of this.

BRIEF DESCRIPTION OF THE DRAWINGS

In the following, the invention will be described in more detail with reference to the appended drawings, in which.

DETAILED DESCRIPTION OF THE INVENTION

Figure 1:
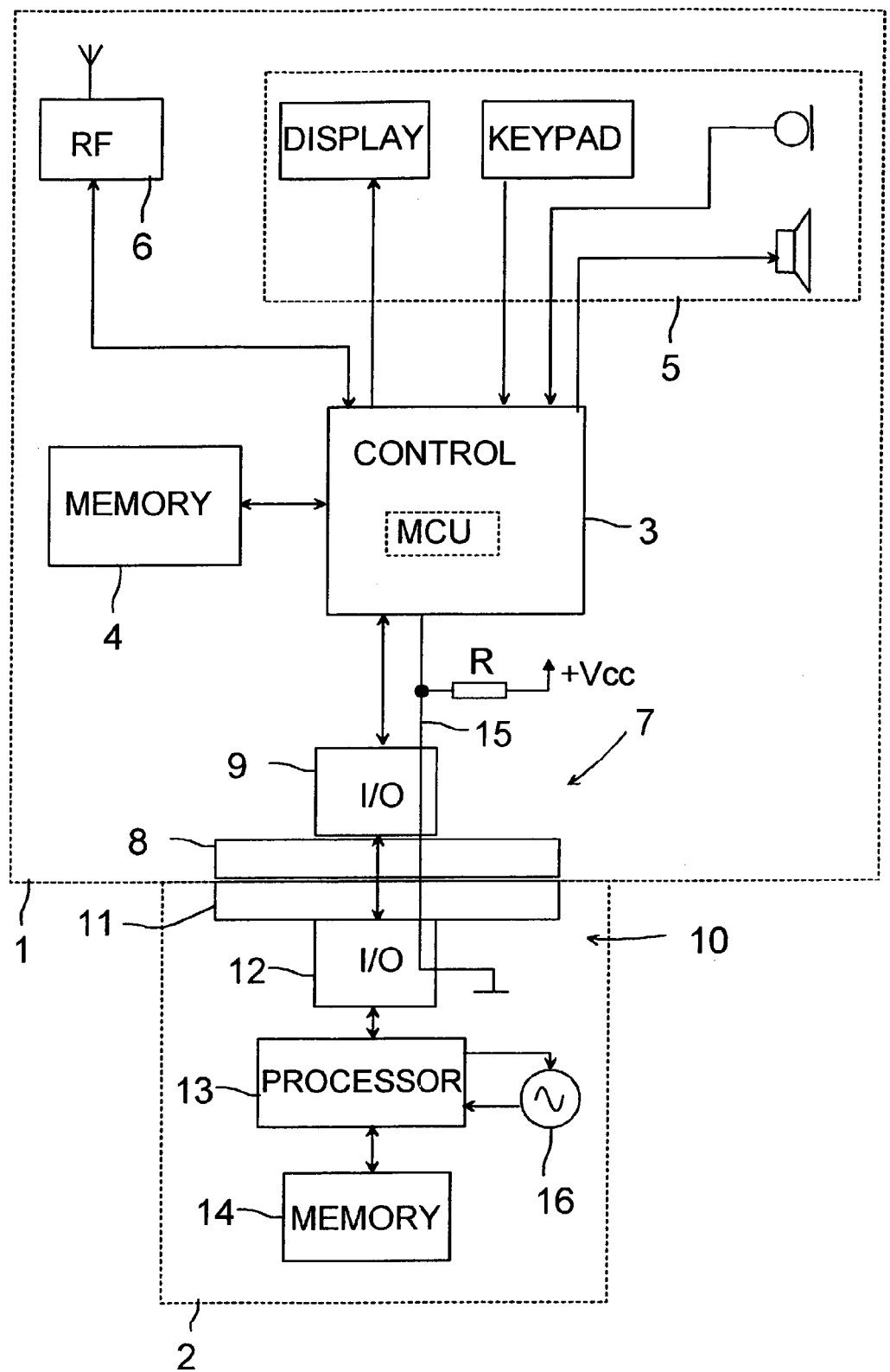
FIG. 1 shows the system according to a preferred embodiment of the invention in a simplified block diagram.

In the system according to an advantageous embodiment of the invention, shown in FIG. 1, the electronic device 1 is exemplified by a wireless communication device. In this example, the peripheral device 2 is a memory card, such as a memory card complying with the MultiMediaCard™ standard. However, it will be evident that the present invention is not limited solely to such electronic devices and peripheral devices, but the invention can also be applied in connection with other electronic devices and peripheral devices. The peripheral device 2 can be, for example, an interface card or also another device. The electronic device 1 contains a control block 3 comprising one or more processors, such as a micro controller unit (MCU). Furthermore, the electronic device 1 comprises a memory 4, a user interface 5 and means 6 for performing mobile station functions, such as GSM and/or UMTS mobile communication means. The user interface 5 preferably comprises a display, a keypad and audio means in a way known as such. For the connection of the peripheral device 2, the electronic device 1 is provided with connecting means 7 which comprise at least one connector 8 as well as the necessary I/O blocks 9, for example to connect the buses of the peripheral device 2 and the electronic device 1 to each other.

The peripheral device is also provided with corresponding connecting means 10 for connecting the peripheral device 2 to the electronic device 1. The connecting means 10 of the peripheral device comprise at least one connector 11 which can be connected to the connector 8 of the electronic device 1, and an I/O block 12. The power supply to the peripheral device 2 is arranged from the electronic device 1 via the connectors 8, 11. The I/O blocks are used for communication between the electronic device 1 and the peripheral device 2. This can take place as parallel data transmission or serial data transmission. For example, said peripheral device according to the MultiMediaCard™ specifications applies serial data transmission. However, in view of the present invention, which format is used for the data transmission between the electronic device 1 and the peripheral device 2 is not significant.

The peripheral device 2 also comprises a processor 13 or the like for controlling the functions of the peripheral device 2. Furthermore, the peripheral device comprises a memory 14, such as a read/write memory (RAM), e.g. for the storage of data, as well as a read-only memory (ROM, NVRAM) for the storage of the program code. The processor is responsible, for example, for controlling the I/O blocks in the data transmission between the peripheral device 2 and the electronic device 1. At least a first maximum value and a second maximum value for power consumption, which are used in the method according to the present invention, are also stored in the memory 14 of the peripheral device. Furthermore, the peripheral device comprises means for generating one or more clock signals required for the operation of the processor, such as a clock generator 16.

The following is a description of the operation of the method according to a preferred embodiment of the invention in a system shown in FIG. 1. For example, information on whether a peripheral device 2 is placed in the connector 8 of the connecting means of the electronic device, is transmitted via the I/O blocks to the electronic device 1. This can be implemented, for example, by providing the I/O block 9, 12 with a detection line 15 whose state is changed when the peripheral device 2 is placed in the connector 8. In this advantageous embodiment of the invention, the detection line 15 is implemented so that the detection line 15 is set in the logical 1 state by means of a pull-up resistance R in the electronic device 1. In the system of FIG. 1, the change of state is achieved in such a way that the peripheral device 2 grounds the detection line 15, wherein the state of the detection line 15 is changed to the logical 0 state. This change of state is detected in the electronic device 1, for example, in such a way that the change of state causes an interrupt in the control block 3, wherein a corresponding interrupt service program is run and the running of the initializing functions of the peripheral device are started. After the operating voltages have been coupled to the peripheral device, the processor 13 of the peripheral device 2 will start to run its own initializing operations. For example, the power consumption of the peripheral device 2 is set to a default value which, in this advantageous embodiment, is a power consumption value according to the first maximum limit. In this context, it is assumed that the first maximum limit is lower than the second maximum limit. The processor also sets the frequency of the clock generator 16 to correspond to this power consumption value. Typically, the frequency of the clock generator is set to a minimum value. In all peripheral devices 2, it is not necessarily possible to control the frequency of the clock generator 16, wherein the clock generator 16 cannot be used for controlling the power consumption.

Figure 3:
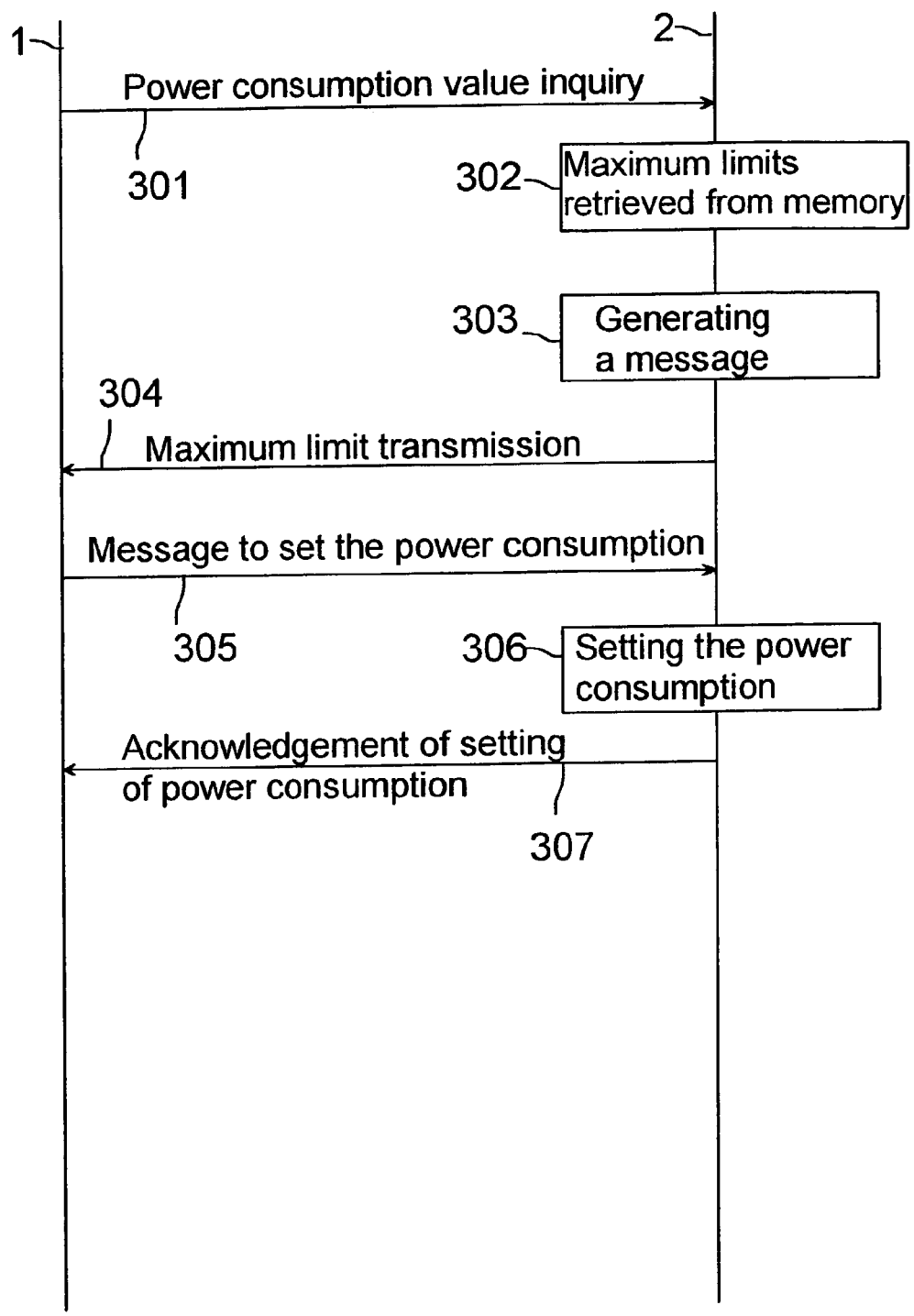
FIG. 3 shows signalling in the method according to a preferred embodiment of the invention in a simplified manner.

In the operations of initializing the peripheral device, performed by the electronic device 1, the type of the peripheral device 2 is preferably examined, which may affect the type of initialization operations to be performed. However, this description will only discuss the operations which are essential in view of the invention. The signalling to be performed in this method according to the advantageous embodiment of the invention is illustrated in a simplified manner in the appended FIG. 3. The determination of the type of the peripheral device 2 will be followed by determining the first and second maximum limits for power consumption which have been stored on the device 2, such as a card. Thus, a maximum limit reading message is preferably transmitted from the electronic device 1 to the peripheral device 2. This is illustrated by a signal on a line 301 in the chart of FIG. 3. The message is received in the peripheral device 2 and its content is preferably examined in the processor 13. On the basis of the message, the processor 13 reads the first maximum limit and the second maximum limit from the memory 14 (block 302 in FIG. 3). If there are more than two maximum limits, the number of the maximum limits is preferably stored in the memory means, wherein the processor 13 reads the values of all the maximum limits from the memory 14. After this, the processor 13 generates a reply message (block 303) containing the requested information, such as the first and second maximum limits and, if necessary, also the number of the maximum limits. In the case of several maximum limits, also the values of the other maximum limits are preferably included in the message. The message is transmitted via the I/O blocks 9, 12 to the electronic device (as indicated by a signal on a line 304), in which the control block reads the information of the received message and, if necessary, stores the information in the memory 4 of the electronic device.

After the maximum limits of power consumption supported by the peripheral device are known in the electronic device 1, it is possible to start to adjust the power consumption of the peripheral device, if necessary. Let us assume that the electronic device 1 is capable of supplying the power corresponding to the second maximum limit to the peripheral device 2. Thus, a power control message is transmitted from the electronic device 1 to the peripheral device 2 (as indicated by a signal on a line 305). This power control message indicates the power consumption value which is to be set as the maximum value for the peripheral device 2, for example said second maximum limit. The processor 13 of the peripheral device examines the type of the received message, and after determining that it is a power control message, reads the maximum value for power consumption indicated in the message (block 306). Next, the processor 13 of the peripheral device sets, for example the operating frequency of the clock generator 16 to a value corresponding to this maximum value for power consumption, for example to the highest possible frequency. In some embodiments, the bus widths within the processor can also be changed according to the maximum limit used for power consumption. Furthermore, the peripheral device 2 preferably informs the electronic device 1 that the power consumption has been limited to the requested value (as indicated by a signal on a line 307).

If the electronic device 1 cannot supply the peripheral device 2 with the power of the second maximum limit, or if, for another reason, the electronic device 1 tends to set the maximum value for power consumption lower than the second maximum limit, it is possible to perform signalling, by which the electronic device 1 and the peripheral device try to find such a maximum limit for power consumption which is suitable in the situation. This can be carried out, for example, in such a way that the electronic device 1 selects, between the first and second maximum limits, a value which is a maximum value from the point of view of the electronic device 1. Information about this limit is transferred to the peripheral device 2, in which the suggested value is examined in the processor 13, and if it is found acceptable, this information is transferred to the electronic device 1. If the peripheral device 2 cannot set its own power consumption to such a level which corresponds to the suggested maximum value, the peripheral device 2 will suggest a lower value between the first and second maximum values. If this value is possible from the point of view of the electronic device 1, the electronic device 1 will transmit this information to the peripheral device 2, in which the power consumption is set to this value. If the value suggested by the peripheral device 2 is not suitable, the electronic device 1 advantageously selects another, preferably lower value which, however, is at least equal to the first maximum limit, and reports it to the peripheral device 2. The above-presented steps are iterated, until such a power consumption value is found which is suitable for both the electronic device 1 and the peripheral device 2. In some cases, it may occur that the only suitable value is the first maximum value, wherein the power consumption does not need to be adjusted, because this value is the default value.

There may also be a need to change the value of the power consumption during the operation of the electronic device 1 and the peripheral device 2 connected together. For example, if the peripheral device is a transceiver card, such as a mobile station card or a modem card, there may be a need to significantly change the power consumption limit of the peripheral device 2, for example, for the time of a transmission. Thus, at the stage when e.g. the peripheral device 2 detects a need to change the power consumption, it transmits a message to the electronic device 1 and proposes a new power consumption value which is, however, in the range between the first and second maximum values. An exchange of messages is performed between the electronic device 1 and the peripheral device 2 by applying the above-described principles, to control the power consumption of the peripheral device according to the need. When the need for power consumption is changed again, a new adjustment of the power consumption can be made.

The need to change the power consumption of the peripheral device may also develop in the electronic device 1. For example, when the operation of the electronic device 1 shifts to a power saving mode, or when the charge of a battery (not shown) in the electronic device is reduced, the electronic device 1 may control the peripheral device 2 to shift to a less power consuming state.

The peripheral device according to the invention can also be connected to such an electronic device 1 which does not have a possibility to adjust the power consumption. Thus, the peripheral device 2 sets a default value, i.e. preferably the first maximum limit, as the power consumption value. Consequently, the peripheral device according to the invention can also be connected to such an electronic device 1 in which the steps of the method according to the invention are not carried out to control the power consumption of the peripheral device 2.

Figure 2:
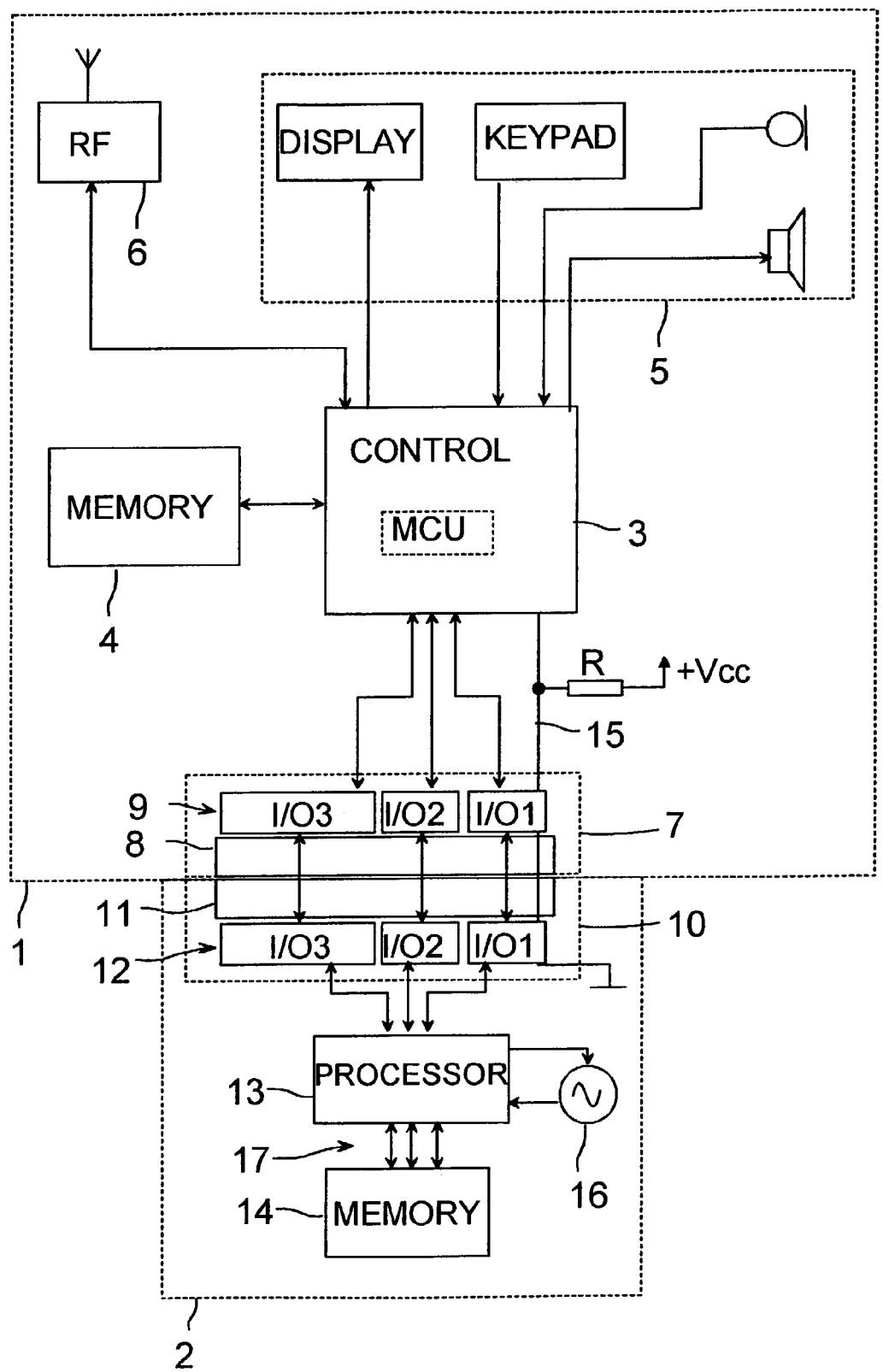
FIG. 2 shows a system according to a second preferred embodiment of the invention in a simplified block diagram.

Above, the use of more than two different maximum limits were mentioned as the maximum values for power consumption. In this context, it is assumed that the other maximum limits are between the first and second maximum limits. These different maximum limits are feasible, for example, in such applications, in which different bus widths can be selected in the peripheral device. For example, in the system of FIG. 2, the bus width of the connection between the peripheral device and the electronic device can be selected to be any of the three values: 8, 16 or 32 bits. At the same time, this bus width selected for the connection is, in this advantageous embodiment, also used in the internal bus 17 of the peripheral device 2. Typically, the power consumption is the higher, the wider the bus used. Thus, the presumption is preferably that the bus width at the start-up stage is 8 bits, but the electronic device 1 and the peripheral device 2 may negotiate on the use of another bus width, i.e. on the change of the maximum limit for power consumption. This can be implemented by applying the principles described above. However, it will be obvious that said bus widths are only some non-restricting examples of bus widths.

The frequency of the clock generator 16 of the peripheral device is not necessarily adjustable in a stepless manner, but it is possible to select a value for the frequency from some predetermined values. Thus, the maximum limits for power consumption corresponding to these different frequencies can be stored as said maximum limits in the peripheral device, or if only the first maximum limit (lowest power consumption) and the second maximum limit (highest power consumption) are stored, it is possible to perform the exchange of messages between the electronic device 1 and the peripheral device, as described above in this description, to adjust the suitable power consumption limit.

Consequently, the power consumption of the peripheral device 2 can be adjusted e.g. by changing the clock frequency and/or the bus width, but it should be evident that other methods for adjusting power consumption are also known and are applicable in connection with the invention. Power consumption can also be controlled by controlling the operating voltage, if the operating voltage of the peripheral device 2 does not need to be a given constant value. Peripheral devices are known, in which the operating voltage can be selected to be, for example, either 3 V, 3.3 V, or 5 V. Yet another example to be mentioned in this context of the possibilities to control the power consumption of the peripheral device is to control the current consumption of the peripheral device.

Further, the power consumption of the peripheral device 2 can also be adjusted by changing the clock frequency of the bus of the connection between the peripheral device and the electronic device, if it is independently adjustable. The clock frequency of the bus can be changed e.g. by the electronic device 1 and/or by the peripheral device 2, if necessary. The electronic device 1 controls a clock generator(s) (not shown) which produces the timing signals for the bus according to the same principles as was presented above.

Figure 4:
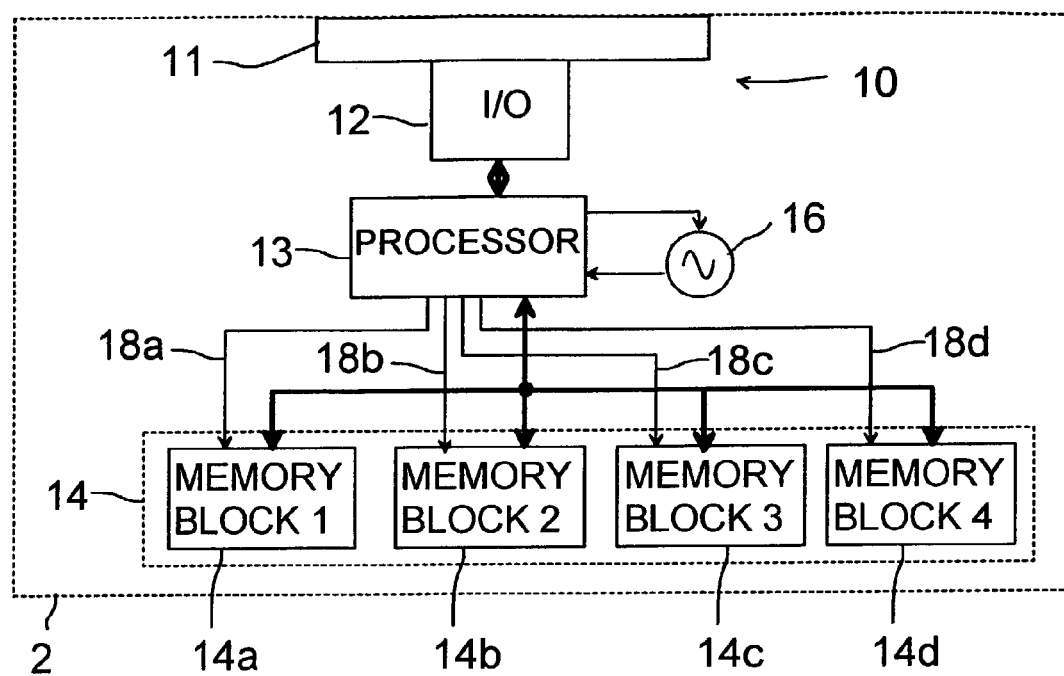
FIG. 4 shows a peripheral device according to yet another preferred embodiment of the invention in a simplified block digram.

In an advantageous embodiment of the invention, at least a part of the memory of the peripheral device 2 is divided into two or more memory blocks, to form so-called storage banks. Thus, in the peripheral device, one or more of these memory blocks can be selected for use, e.g. on the basis of the maximum power consumption value defined for the peripheral device 2. With higher power consumption values, it is typically possible to take more memory blocks into use than with lower power consumption values. FIG. 4 shows an example of the structure of such a peripheral device. In the peripheral device 2 shown in FIG. 4, the memory 14 is provided with four memory blocks 14a, 14b, 14c, 14d, but it will be obvious that in practical applications, the number of storage banks can, within the scope of the invention, also be other than four. To take the memory blocks 14a-14d into use and to remove them from service, connection lines 18a-18d are preferably provided from the processor 13, to couple e.g. the operating voltage to the desired memory blocks 14a-14d, or the coupling lines are used to switch each memory block 14a-14d either to an active mode or to a power-saving mode. Also the above-presented method can be used to control the power consumption of the peripheral device 2 instead of or in addition to the methods for controlling the power consumption as presented above in this description.

In the electronic device 1, the power control can be performed, for example, by providing the electronic device 1 with a power source whose output voltage can be changed. Thus, in the electronic device 1, the operating voltage to be supplied to the peripheral device is selected to be the voltage value corresponding to the power consumption at the time.

The method according to the invention can also be applied in the implementation of various contents for use in connection with electronic devices 1, for example in the following way. As the peripheral device 2, it is possible to use a memory card, such as a card complying with the definitions of the MultiMediaCard™ standard, in which contents can be stored. In this context, contents refer to data files, application programs, electronic books, audiovisual information, such as music, videos, etc. For example, a content provider stores such contents on the memory card. Thus, the memory card 2 is connected to an electronic device provided with means for transferring the content to the memory card 2. Thus, before starting the storage, the electronic device and the memory card 2 set the power consumption of the memory card preferably to a value corresponding to the second maximum limit. This is possible, because in such an electronic device 1 used for storing contents, the power consumption of the memory card has hardly any significance, but the electronic device 1 can supply the memory card 2 with the sufficient power. The storage can thus be performed at a maximum rate, because the clock frequency and/or bus width of the memory card can be set to the maximum. Also, the checkup of the content stored on the memory card 2, to detect possible storage defects, can be performed at a maximum rate. Thanks to the maximum storage and/or checkup rate, the content production rate of the electronic device 1 can be increased when compared with methods of prior art.

In a corresponding manner, at the stage when the content stored on the memory card 2 is to be used in an electronic device 1, the power consumption of the memory card 2 can be set to a level which is suitable for the electronic device 1, for example to the lowest possible power consumption. Thus, when applying the method of the invention, the content production rate does not need to be limited according to the maximum power consumption value possible in the use of the content.

Because the method according to the invention can be used for the power control of the peripheral device, the peripheral device 2 can be connected to a variety of electronic devices. In some electronic devices, it is only possible to supply the peripheral device with the power (voltage and current) corresponding to the minimum power consumption, wherein the electronic device 1 does not need a large regulator, and the size of the electronic device does not need to be increased because of the need of space for a large regulator. On the other hand, power consumption does not need to be restricted in peripheral devices 2 to be developed, because the suitable power consumption value can be negotiated by the electronic device and the peripheral device. Thus, if the peripheral device is connected to such an electronic device, in which a relatively high power can be supplied to the peripheral device connection, the peripheral device can be used as efficiently as possible (with a high clock frequency/large bus width). At the stage of initialization, even such a peripheral device will operate with a lower power consumption, until a suitable power consumption value has been selected. In the system according to the invention, it is possible to provide for the use of peripheral devices which will be developed in the future and may require even high power in electronic devices. However, it is not necessary to consider cards with a high power consumption in the design of all electronic devices.

It will be evident to those of skill in the art that the steps to be taken in the setting of the power consumption can also be implemented in another way than the above-presented hand-shake in the form of messages. For example, the connection means 7, 10 can be provided with connection lines which are used to set the power consumption of the peripheral device. Furthermore, the invention can be applied in such a way that certain alternative (allowable) values are defined for said maximum limits, wherein the first maximum limit and the second maximum limit for each peripheral device is selected from the set of these alternative limits.

It should also be mentioned that the peripheral device 2 does not need to be a card-format peripheral device, but the peripheral device 2 used can also be another device which can be connected to the electronic device 1. One non-restrictive example to be mentioned of such a peripheral device is a camera which is connected, for example, to a wireless communication device, a computer, or the like.

Thus, by controlling the power consumption, it is possible to affect the functional properties of the camera. For example, the rate of updating the images of the camera on the display of the electronic device may be lower with a lower power consumption than with a higher power consumption. Thus, the electronic device 1 may preferably set the power consumption of the camera used as the peripheral device 2 on the basis of how high a power can be supplied by the electronic device 1 to the peripheral device. In an advantageous embodiment of the invention, also the user of the electronic device 1 can set a maximum limit for the power consumption, wherein the user can, if necessary, e.g. reduce the maximum limit to prolong the time of operation of the electronic device.

It should be evident that the present invention is not limited solely to the above-presented embodiments but can be modified within the scope of the appended claims.

The invention claimed is:

1. A method comprising:
   initiating determination of power consumption in an electronic device, to which a peripheral device is connected, and from which the power is supplied to the peripheral device, wherein the peripheral device comprises a memory, said memory storing a default value and a limiting value for the power consumption;
   setting the power consumption of the peripheral device at a startup state to said default value;
   reading from the memory at least said limiting value which is higher than said default value; and
   setting the maximum of the power consumption to a value which is in a range from said default value to said limiting value, wherein the range includes said default value and said limiting value,
   wherein information is transferred from the electronic device to the peripheral device for setting the maximum of the power consumption of the peripheral device.

2. The method according to claim 1, wherein said limiting value is used as a highest allowable value for the power consumption.

3. The method according to claim 1, wherein at least one content is stored in the peripheral device, for use in connection with the electronic device, wherein at a stage of storing the content, the power consumption set for the peripheral device is a value corresponding to said limiting value, and at a stage of using the content, the power consumption set for the peripheral device is a value corresponding to said default value.

4. The method according to the claim 1, wherein at least one clock signal is generated in the peripheral device and wherein the power consumption of the peripheral device is controlled by adjusting the frequency of at least one clock signal.

5. The method according to the claim 1, wherein the peripheral device comprises at least one bus and that the power consumption of the peripheral device is controlled by controlling a width of said bus.

6. The method according to the claim 1, wherein the peripheral device is provided with two or more storage blocks controlled by controlling a number of storage blocks processed by the peripheral device substantially simultaneously.

7. A method comprising:
   initiating determination of power consumption in an electronic device, to which a peripheral device is connected, and from which the power is supplied to the peripheral device, wherein the peripheral device comprises a memory, said memory storing a default value and a limiting value for the power consumption;

setting the power consumption of the peripheral device at a startup stage to said default value;

reading from the memory at least said limiting value which is higher than said default value; and setting the maximum of the power consumption to a value which is in a range from said default value to said limiting value, wherein the range includes said default value and said limiting value, wherein messages are transferred between the electronic device and the peripheral device for setting the maximum of the power consumption of the peripheral device to a value in a range from said default value to said limiting value, wherein the range includes said default value and said limiting value.

8. The method according to claim 7, wherein said limiting value is used as a highest allowable value for the power consumption.

9. A system comprising a peripheral device, wherein the peripheral device comprises a memory, said memory storing a default value and a limiting value for the power consumption;

an electronic device with means for connecting the peripheral device and means for supplying power to the peripheral device, and means for determining power consumption, wherein the power consumption of the peripheral device is set at a startup stage to said default value, wherein at least said limiting value which is higher than said default value is stored for the power consumption, wherein the means for determining the power consumption comprise means for setting a maximum power consumption of the peripheral device to a value which is in a range from said default value to said limiting value, said range including said default value and said limiting value, and wherein the electronic device is configured to transfer information to the peripheral device for setting the maximum of the power consumption of the peripheral device.

10. The system according to claim 9, wherein the peripheral device comprises means for generating at least one clock signal, and wherein the system comprises means for controlling the power consumption of the peripheral device by adjusting the frequency of said at least one clock signal.

11. The system according to claim 9, wherein the peripheral device comprises at least one bus, and wherein the system comprises means for controlling the power consumption of the peripheral device by adjusting a bus width of the peripheral device.

12. The system according to the claim 9, wherein the peripheral device is provided with two or more storage blocks, and wherein the means for controlling the power consumption of the peripheral device comprise means for adjusting a number of storage blocks processed by the peripheral device substantially simultaneously.

13. The system according to the claim 9, wherein the electronic device is a portable electronic device.

14. The system according to claim 13, further comprising means for performing mobile station functions.

15. An electronic device comprising:

means for connecting a peripheral device, wherein the peripheral device comprises a memory, said memory storing a default value and a limiting value for the power consumption;

means for supplying power to the peripheral device; and means for determining power consumption, wherein the power consumption of the peripheral device is set at a startup stage to said default value, wherein at least said limiting value which is higher than said default value is defined for the power consumption, wherein the means for determining the power consumption comprise means for setting a maximum power consumption of the peripheral device to a value which is in a range from said default value to said limiting value, said range including said default value and said limiting value, and wherein the means for supplying the power is configured to transfer information to the peripheral device for setting the maximum of the power consumption of the peripheral device.

16. The electronic device according to claim 15, wherein it is a portable electronic device.

17. The electronic device according to claim 16, further comprising means for performing mobile station functions.

18. A peripheral device comprising:

a memory storing a default value and a limiting value for power consumption;

means for connecting the peripheral device to an electronic device for supplying power to the peripheral device, wherein the power consumption of the peripheral device is set at a startup stage to said default value, wherein at least said limiting value which is higher than said default value is defined for power consumption, wherein the peripheral device comprises means for setting a maximum power consumption of the peripheral device to a value which is in a range from said default value to said limiting value, said range including said default value and said limiting value, and wherein the peripheral device is configured to receive information from the electronic device for setting the maximum of the power consumption of the peripheral device.

19. The peripheral device according to claim 18, wherein at least one content is stored in the peripheral device for use in connection with the electronic device.

20. The peripheral device according to claim 18, further comprising means for generating at least one clock signal and means for controlling the power consumption of the peripheral device by frequency control of said at least one clock signal.

21. The peripheral device according to claim 18, further comprising at least one bus and means for controlling the power consumption of the peripheral device by controlling a bus width of said bus of the peripheral device.

22. The peripheral device according to the claim 18, wherein the peripheral device is provided with two or more storage blocks, and wherein the means for controlling the power consumption of the peripheral device comprise means for controlling a number of storage blocks processed by the peripheral device substantially simultaneously.

23. The peripheral device according to the claim 18, wherein said default value and at least one limiting value are stored in the peripheral device.

24. The peripheral device according to the claim 18, wherein said peripheral device is a MultiMediaCard™ peripheral device.

25. An electronic device comprising:
a connector configured to connect to a peripheral device, wherein the peripheral device comprises a memory, said memory storing a default value and a limiting value for the power consumption;
a power supply configured to supply power to the peripheral device; and
a power gauge configured to determine power consumption,
wherein the power consumption of the peripheral device is set at a startup stage to said default value,
wherein at least said limiting value which is higher than said default value is defined for the power consumption,
wherein the means for determining the power consumption comprise means for setting a maximum power consumption of the peripheral device to a value which is in a range from said default value to said limiting value, said range including said default value and said limiting value, and
wherein the electronic device is configured to transfer information to the peripheral device for setting the maximum of the power consumption of the peripheral device.

26. The electronic device according to claim 25, wherein it is a portable electronic device.

27. The electronic device according to claim 25, further comprising a memory configured to store the default value and the limiting value.

28. A peripheral device comprising:
a memory storing a default value and a limiting value for power consumption;
a connector configured to connect the peripheral device to an electronic device for supplying power to the peripheral device,
wherein the power consumption of the peripheral device is set at a startup stage to said default value,
wherein at least said limiting value which is higher than said default value is defined for power consumption,
wherein the peripheral device comprises means for setting a maximum power consumption of the peripheral device to a value which is in a range from said default value to said limiting value, said range including said default value and said limiting value, and
wherein the peripheral device is configured to receive information from the electronic device for setting the maximum of the power consumption of the peripheral device.

29. The peripheral device according to the claim 28, wherein said default value and at least one limiting value are stored in the peripheral device.

* * * * *